(12) United States Patent
Schmidt et al.

(10) Patent No.: US 11,910,424 B2
(45) Date of Patent: *Feb. 20, 2024

(54) REDUCING INTERFERENCE FROM DEVICES AT EXTRAORDINARY ALTITUDES

(71) Applicant: IPCom GmbH & Co.KG, Pullach (DE)

(72) Inventors: Andreas Schmidt, Braunschweig (DE); Maik Bienas, Schoeppenstedt (DE); Martin Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,111

(22) Filed: Jun. 22, 2022

(65) Prior Publication Data
US 2022/0330257 A1 Oct. 13, 2022

Related U.S. Application Data

(63) Continuation of application No. 16/635,072, filed as application No. PCT/EP2018/071500 on Aug. 8, 2018, now Pat. No. 11,405,925.

(30) Foreign Application Priority Data

Aug. 8, 2017 (EP) ..................................... 17185305

(51) Int. Cl.
*H04W 72/08* (2009.01)
*H04W 72/541* (2023.01)
(Continued)

(52) U.S. Cl.
CPC .......... *H04W 72/541* (2023.01); *H04B 7/185* (2013.01); *H04W 36/16* (2013.01); *H04W 72/21* (2023.01); *H04W 88/06* (2013.01)

(58) Field of Classification Search
CPC ............... H04W 72/082; H04W 36/06; H04W 72/0413; H04W 88/06; H04B 7/185
See application file for complete search history.

(56) References Cited

U.S. PATENT DOCUMENTS 11,228,990 B2 * 1/2022 Jeon ...................... H04W 52/50
2003/0164794 A1 * 9/2003 Haynes .............. H04B 7/18504
342/353

(Continued)

OTHER PUBLICATIONS

"Proposal of potential LTE enhancements for Aerial Vehicles", vol. RAN WG2, No. Hangzhou, China; May 15, 2017-May 19, 2017, May 19, 2017 (May 19, 2017), 3GPP DRAFT; R2-1705999_Proposal Of Potential LTE Enhancements for Aerial Vehicles, 3rd Generation Partnership Project (3GPP), Mobile Competence Centre ; 650, Route Des Lucioles ; F-06921 Sophia-Antipo.

*Primary Examiner* — Mewale A Ambaye
(74) *Attorney, Agent, or Firm* — PROI Intellectual Property US; Klaus Michael Schmid (57) ABSTRACT

A method of reducing interference in a mobile communication system is provided to reduce interference caused by a first user equipment, UE, device operating in a cell at a significantly higher altitude than other UE devices in the cell so as to cause interference. The method detects that the first UE device is operating at an altitude considered by the mobile communication system to be an extraordinary altitude and reduces interference caused by the first UE device operating at the extraordinary altitude by controlling the operation of the first UE device.

11 Claims, 7 Drawing Sheets

(51) Int. Cl.
*H04B 7/185* (2006.01)
*H04W 36/16* (2009.01)
*H04W 88/06* (2009.01)
*H04W 72/21* (2023.01)

(56) References Cited

U.S. PATENT DOCUMENTS

| | | | |
|---|---|---|---|
| 2015/0358848 A1* | 12/2015 | Kim | H04W 56/001 |
| | | | 370/252 |
| 2017/0150373 A1* | 5/2017 | Brennan | H04W 4/40 |
| 2018/0155024 A1* | 6/2018 | Lee | B64C 39/024 |
| 2018/0278322 A1* | 9/2018 | Mengwasser | H04B 7/18515 |
| 2018/0288713 A1* | 10/2018 | Kosseifi | H04W 36/32 |
| 2018/0339768 A1* | 11/2018 | Wang | G05D 1/106 |
| 2021/0029768 A1* | 1/2021 | Shih | H04W 74/0833 |

* cited by examiner

REDUCING INTERFERENCE FROM DEVICES AT EXTRAORDINARY ALTITUDES

This invention relates to controlling interference caused by user equipment devices (UEs) operating at altitudes substantially different to other UEs. The invention concerns the functional entities and protocols used in a cellular communication system according to 3GPP's suite of LTE and LTE-Advanced specifications. It may also be realized in upcoming 5G standards. In the following, the term "altitude" may mean a height above the ground if the altitude is measured using, for example, a barometric device or a height above sea level if, for example, the altitude is measured using GPS signals.

3GPP TS 36.306 lists various UE radio access capability parameters for functions for which there is a possibility for UEs to signal different values. 3GPP TS 36.331 defines the encoding of the above mentioned information elements and describes the messages to be exchanged at RRC protocol layer in context of the UE capability transfer procedure.

The network may initiate this procedure to a UE in RRC_CONNECTED when it needs a particular UE's (initial or additional) capability information. The base station (eNodeB, eNB) is required to respect the signalled capability parameters when configuring the UE and when scheduling the UE.

If the UE has changed its E-UTRAN radio access capabilities, the UE shall request higher layers to initiate the necessary non-access stratum (NAS) procedures that would result in the update of UE radio access capabilities using a completely new RRC connection.

Any UE's radio access capabilities may contain several sets of radio access technology (RAT) specific capabilities, such as capabilities for E-UTRA, UTRA, GERAN-CS, GERAN-PS, CDMA2000, so the entire set of information can become very large. In order to reduce the load on the LTE Uu air interface during a state transition from RRC_IDLE to RRC_CONNECTED, the mobility management entity (MME) may store the UE's capabilities and provide them to the base station (eNodeB) during initial UE context setup over the S1 interface.

In case the MME doesn't have a valid set of UE capabilities, the base station (eNodeB) may choose to acquire the capabilities from the mobile device directly using a UE Capability Enquiry RRC message. This message may contain a list of those RATs for which the UE is requested to transfer its radio access capabilities. In response to it, a UE Capability Information RRC message is used to transfer the requested radio access capabilities of the UE to the base station (eNodeB).

The UE Capability Information RRC message may (among others) contain the "UE E-UTRAN capability" information element and the feature group indicators defined for mandatory features.

For direct device-to-device (D2D) communication in LTE the PC5 air interface ("sidelink") was specified during 3GPP Rel-12 timeframe. First use cases for introducing sidelink communication in LTE were related to public safety. As deployed LTE networks also provide an opportunity for the automotive industry to realize the vision of 'connected cars', LTE support for vehicular communication was studied and specified later in 3GPP during Rel-14 timeframe. The enhancements required to support various vehicular communication services, commonly denoted as V2X services (including vehicle-to-vehicle V2V, vehicle-to-infrastructure V2I, vehicle-to-network V2N and vehicle-to-pedestrian V2P), are for instance related to sidelink resource allocation, physical layer structure, and synchronization. However, vehicular communication scenarios are not solely related to the LTE PC5 interface, some of them may additionally include the LTE Uu interface (thereby combining Uu and PC5). The maximum efficiency of V2X services may be achieved by selecting/switching the operation scenario properly.

All sidelink (SL) communication takes place on (a subset of) the LTE system's uplink resources, i.e. the LTE PC5 air interface uses (to a certain extent) the same frequency/time resources that are specified for uplink transmissions on the LTE Uu air interface. In other words: In case of FDD-LTE the uplink carrier frequencies are used for sidelink communication and in case of TDD-LTE uplink subframes are used for sidelink communication in a given cell. The LTE Uu air interface supports uplink and downlink traffic and the LTE PC5 air interface is the sidelink interface defined for D2D and V2X use cases.

During RAN Plenary #75 in March 2017 a new study item on "Enhanced Support for Aerial Vehicles" was discussed and approved for the RAN working groups in document RP-170779.

The motivation for bringing this study item to 3GPP is based on the growing number of drones (or, unmanned aerial vehicles, UAVs). Example use cases for drones comprise package delivery, search-and-rescue, monitoring of critical infrastructure, wildlife conservation, flying cameras, and surveillance. And similar use cases are likely to emerge in the coming years. Many of the before-mentioned use cases would benefit from connecting drones to cellular communication systems (e.g., to LTE networks) as a UE. Consequently, more and more of these drones are (or, will be) equipped with UE functionality.

In principle, there are two ways to bring UE functionality to drones: firstly, drones that allow people to attach cell phones to their drones, and secondly commercially available drones that are equipped with embedded cellular modems. A drone that is equipped with UE functionality (in any possible way) will be referred to as a "Drone-UE" herein.

In future, a large population of Drone-UEs may supplement the legacy UE population on (or, close to) the ground, and some mobile network operators (MNOs) have identified a need to better prepare their current cellular communication networks for the upcoming data traffic growth caused by Drone-UEs.

Uplink signals of Drone-UEs that are flying at "extraordinary" altitudes (i.e. altitudes above ground level that are significantly higher than those usually used by "legacy" UEs in a given location) may cause heavy interference in neighbouring cells. This interference is not restricted to direct neighbours; instead it is likely that this interference has also an effect on second next, third next (and so on) neighbouring cells (i.e. neighbours of a higher "neighbourhood grade").

Currently, there are no means for the MNO to detect Drone-UEs that are flying at extraordinary altitude layers, nor to mitigate the interference caused by Drone-UEs, for instance by controlling the operation of such Drone-UEs (e.g., by limiting the maximum transmit power, the maximum data rate, and so on), or restricting the admission of such Drones-UEs to the network, or coordinating the radio resources between impacted cells, so that the perceived throughput performance of conventional UEs on the ground (incl. D2D and V2X services operating in UL frequency bands) is not deteriorated.

US 2017/0171761 A1 describes techniques for addressing interference and mobility management using unmanned aerial vehicles acting as base stations. US 2017/0175413 A1 is an example describing the operation of multiple drones in general but does not relate to mobile communication issues. US 2017/0013478 A1 describes using drones for monitoring a wireless network in order to reduce cell tower interference. 3GPP document 3GPP TSG-RAN2 Meeting #98 R2-1705999 submitted by KDDI describes measurements relating to the success of a handover of a Drone-UE from one base station to another depending on its altitude. The document is silent as to the Drone-UE causing interference but indicates that the Drone-UE may suffer from interference from other base stations.

3GPP document 3GPP TSG WG1 Meeting #89 R1-1707016 submitted by Huawei and HiSilicon indicates that a Drone-UE may cause interference to uplink signals of terrestrial UEs for multiple cells and so interference coordination between neighbouring cells should be considered, with a solution being the serving eNB of a Drone-UE informing neighbouring cells of a resource utilization of the Drone-UE so that the neighbouring cells can avoid scheduling UEs on the same resource or schedule cell centre UEs (i.e. those remote from the Drone-UE) on that resource. There is no dependency on an operating height of the Drone-UE 3GPP document 3GPP TSG-RAN2 Meeting #98 R2-1704997 submitted by Huawei and HiSilicon indicates that Drone-UEs can suffer from interference from neighbour cells and other UEs and discusses handover criteria. Beamforming towards the Drone-UE is also suggested.

US 2017/0150373 A1 describes the steering of A Drone-UE antenna towards a base station for example prior to handover.

The present invention provides a method of reducing interference in a mobile communication system caused by a first user equipment, UE, device operating in a cell at a significantly higher altitude than other UE devices in the cell so as to cause interference, the method comprising detecting that the first UE device is operating at an altitude considered by the mobile communication system to be an extraordinary altitude; and reducing interference caused by the first UE device operating at the extraordinary altitude by controlling the operation of the first UE device.

The first UE device of the invention is typically an unmanned aerial vehicle or so-called "drone", referred to hereinafter as a Drone-UE.

In general, this invention addresses the problem of UEs that cause high interference due to an extraordinary high position and how this can be detected with network assistance. Furthermore, various solutions for avoiding or limiting such interference are provided. The solutions enable a mobile network operator (MNO) to protect other UEs in neighbouring cells, especially those located near ground level (incl. those involved in D2D and V2X operation) from such interferences.

A first aspect of this invention is to detect if a Drone-UE is operated in "extraordinary" altitudes, i.e. in "higher than usual altitudes for a given location" (e.g., when the UE is attached to or deployed in drones). These "higher than usual altitudes" could for instance be altitudes that are higher than the mounting height of base station antennas or remote radio heads. It is also part of the invention to detect when Drone-UEs are coming down into the range of "usual altitudes" where they can be treated as legacy UEs again.

A second aspect of this invention is a location dependent definition of "extraordinary altitudes" and "usual altitudes". In some regions 15 m above the ground might represent the threshold above which no legacy UEs can be expected to operate (e.g., in a suburb with predominantly family homes), while in other areas 150 m or even up to 400 m (big cities with high-rise buildings) may be an appropriate threshold. Data base interrogations to retrieve locally valid thresholds and case-by-case decisions to determine what "higher than usual altitudes" actually mean are therefore part of the present invention.

A third aspect of this invention is to provide means for an MNO to reduce the interference caused by a Drone-UE (or, to keep it at least in certain boundaries). The MNO may control the radio access of the Drone-UE carefully based on the measured interference level caused by the Drone-UE in neighbouring cells. In contrast to state-of-the-art, where only the aggregated amount of power from unknown sources can be detected in neighbouring cells, our method allows detection and measurement of a particular Drone-UE's UL signal in a cell other than the serving cell, i.e. the individual interference actually caused by the device under investigation can be reported back to its serving cell. For this, an exchange of Drone-UE specific resource occupation data (incl. the individually configured UL reference signals) between involved base stations (inter-node signalling) is defined in the present invention.

A fourth aspect of this invention is closely related to the means provided to an MNO to reduce the interference caused by a Drone-UE as described in the previous paragraph. We propose to establish an iterative control loop and to adjust the radio access settings gradually in order to arrive at the optimum compromise. In other words, we propose to apply a stepwise reduction or increase of parameters for the Drone-UE, to measure the interference caused by the Drone-UE in neighbouring cells after each adjustment step, and to give feedback to the cell serving the Drone-UE.

A fifth aspect of this invention is a hierarchical interference level measurement procedure stepwise involving more and more neighbouring base stations (first the direct neighbour(s), then the second next neighbour(s), followed by the third next neighbour(s), and so on). There are two possible directions for this hierarchical procedure:

The procedure is initiated by the base station associated with the serving cell:
Neighbouring base stations are asked to what extent the UL signal of a particular Drone-UE (operating in "extraordinary" altitudes) actually causes UL signal deterioration in neighbouring cells. And at least relevant neighbouring base stations which are associated with cells in which the Drone-UE actually causes UL signal deterioration reply. The request is propagated to neighbouring base stations of a higher neighbourhood grade, thereby stepwise involving more and more neighbouring base stations.
The procedure is initiated by a base station associated with a cell in which UL signal deterioration is a problem: The neighbouring base stations are asked if they operate (or, serve) a Drone-UE that might be the cause for the detected UL signal interference. Here, too, the request may be propagated to neighbouring base stations of a higher neighbourhood grade, thereby stepwise involving more and more neighbouring base stations in the process. The base stations which is associated with the serving cell of the Drone-UE that is causing the UL signal deterioration may then choose to reduce the interference caused and/or reply back to the base station that has originated the request.

A sixth aspect of this invention deals with the adjustment of radio access parameters aiming at reducing the interference caused in neighbouring cells. For instance, this objective can be achieved by applying at least one of the following means: reducing the UL transmit power in the Drone-UE; configuring long hibernation cycles for the Drone-UE; turning off the radio transmitter of the Drone-UE; applying service limitations (i.e. disabling certain bearers or services for the Drone-UE); reconfiguring the physical resources to be used for the Drone-UE's UL traffic (without changing the current serving cell); triggering handover to another cell or frequency layer, for example away from lower frequencies towards higher frequencies (and vice versa), away from a small cell towards a macro cell (and vice versa); switching from predominantly omnidirectional UL transmission characteristics to highly directive UL beam transmissions, using special cell admission control methods, for example disallowing access for Drone-UEs to certain cells (as long as these are operating in "extraordinary" altitudes), allowing access for Drone-UEs to certain cells (as soon as these are operating in "usual" altitudes again); triggering handover to another Radio Access Technology (RAT); engaging in an UL resource occupation coordination process with neighbouring base stations (incl. resource assignment for D2D and V2X traffic), for example with $1^{st}$ grade neighbours (i.e. with direct neighbouring cells), $2^{nd}$ grade neighbours, $3^{rd}$ grade neighbours so that the perceived throughput performance of the conventional terrestrial UEs is not degraded too much.

A seventh aspect of the present invention is about enhancing the UE radio access capabilities to support the inventive method.

The invention provides a method to prepare cellular communication networks, such as LTE, for the upcoming data traffic growth caused by Drone-UEs that are flying at "extraordinary" altitudes (e.g., hobby or commercial drones equipped with cellular modems). Special focus is given on network assistance and inter-node signalling (e.g., between base stations) for the mitigation of UL interference caused by such devices in neighbouring cells.

The MNO is enabled to identify Drone-UEs that are operating in "extraordinary" altitudes from legacy UEs on the ground. The MNO is also enabled to find the source of interference and to avoid or gradually limit the UL deterioration and thus to obtain a higher system throughput. In addition, various interference mitigation techniques to protect the legacy UE population residing on the ground (incl. those involved in D2D and V2X operation) are provided.

Embodiments of the invention will now be described, by way of example only, with reference to the accompanying drawings in which.

At low altitudes a "Drone-UE" usually behaves like a conventional UE, but at higher altitudes the radio propagation characteristics change and the Drone-UE's UL signal may turn out to be problematic, as it becomes more visible to multiple cells due to line-of-sight propagation conditions.

Figure 1:
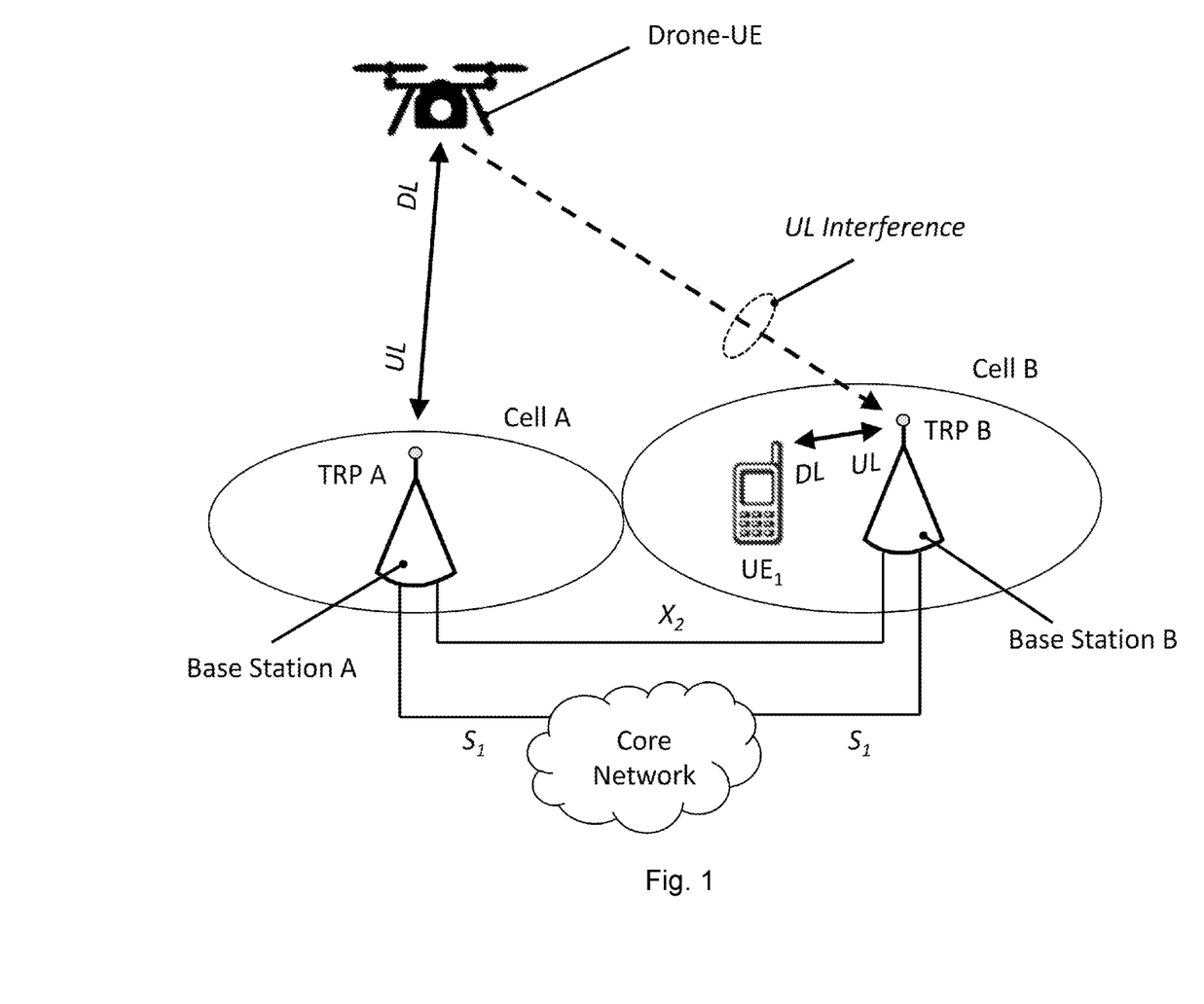
FIG. 1 illustrates a drone equipped with UE functionality connected to a base station and causing interference at a neighbouring base station.

In detail, the UL signal transmitted from such a high-flying Drone-UE may dramatically increase the interference on the UL signals of other UEs in neighbouring cells, as depicted in FIG. 1. Thus, a Drone-UE's UL signal may have a negative impact on other UEs residing/deployed on the ground (e.g. smartphone, IoT device, etc.).

The main difference between UL signals transmitted by high-flying Drone-UEs and those transmitted by conventional zero-altitude UEs is that the radiation pattern is considerably different, and thus the assumed radiation patterns for "legacy" ground-based UEs that were initially used during the network planning phase do not apply anymore. This is mainly due to the fact, that at higher positions, less attenuating obstacles reside between a Drone-UE and neighbouring cells. It may well be that a Drone-UE served by one cell interferes much more into a second or third next cell than it interferes into the direct neighbour cell. In other words, the prediction of which neighbouring cells are interfered by a high-flying Drone-UE is much more difficult (when compared with a "legacy" zero-altitude UE. As a result, cell planning cannot be optimal for all UEs.

Figure 2:
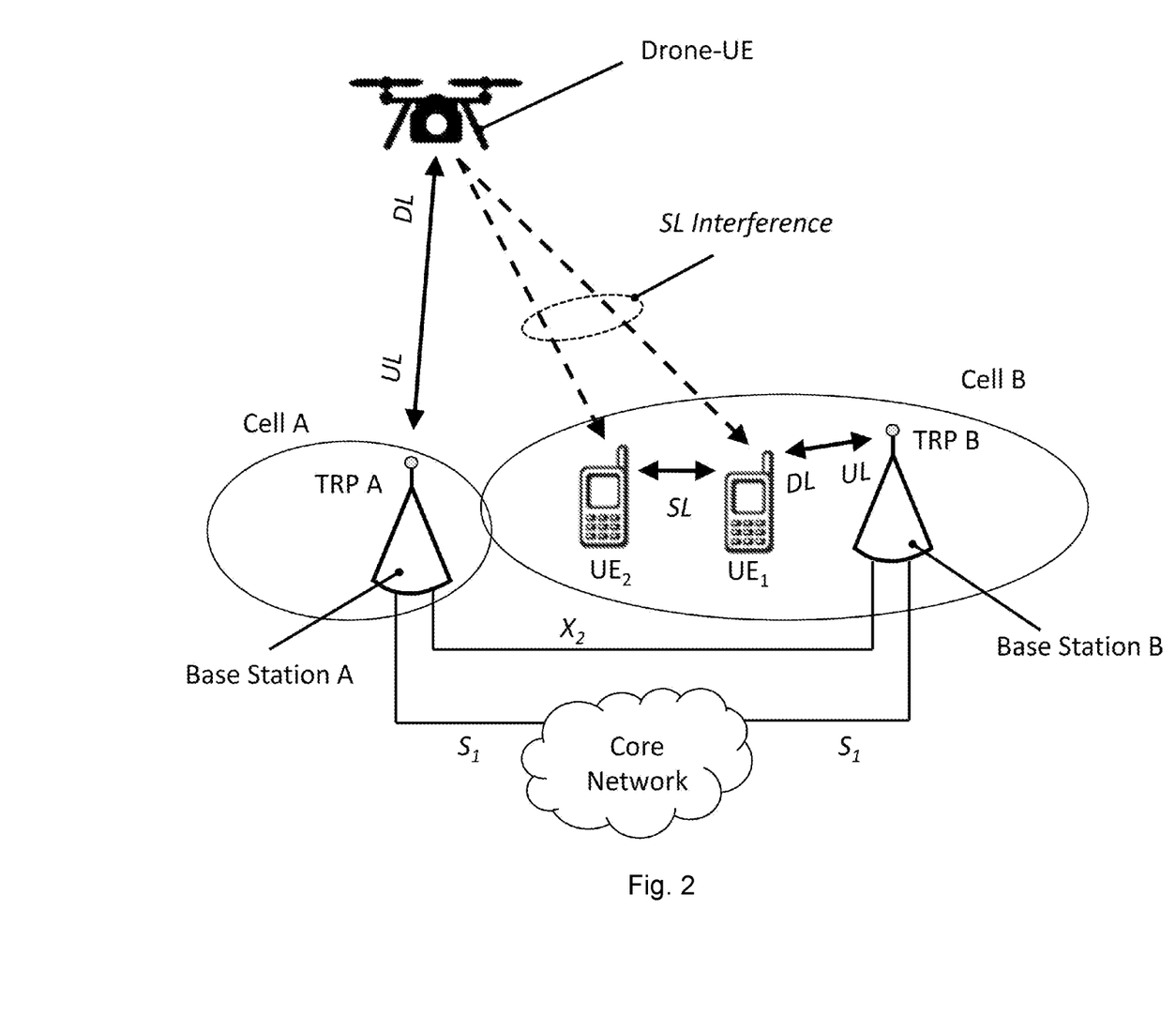
FIG. 2 illustrates a drone equipped with UE functionality connected to a base station and causing interference among UEs engaged in device to device operation.

Furthermore, a Drone-UE's widely visible UL signal may also be problematic for sidelink communication (for instance, in the scope of D2D or V2X), as all PC5 traffic is defined to take place on UL resources, i.e. on the same uplink carrier frequencies that are specified for uplink transmissions in case of LTE-FDD, and on the same uplink subframes that are specified for uplink transmissions in case of LTE-TDD. FIG. 2 shows the interference caused by a Drone-UE's UL signal on the SL channel established between two UEs involved in D2D (or V2X) operation in a neighbouring cell.

Also, a Drone-UE's UL signal may cause interference on both, other UE's UL signals (as shown in FIG. 1) and SL communication between two UEs involved in D2D (or V2X) operation (as shown in FIG. 2), at the same time.

The terms "UL signal interference" or "UL signal deterioration" as used throughout this specification therefore explicitly include interference on SL communication.

In principle, there are two different ways to detect whether a Drone-UE is entering or leaving "extraordinary" altitude levels and coming back to "usual" altitude levels:

A) The Drone-UE is configured to report its altitude to the network infrastructure; or B) The network infrastructure determines the Drone-UE's altitude by means of different coverage layers or beam forming.

With regard to option A, this may be implemented as follows.

Figure 3:
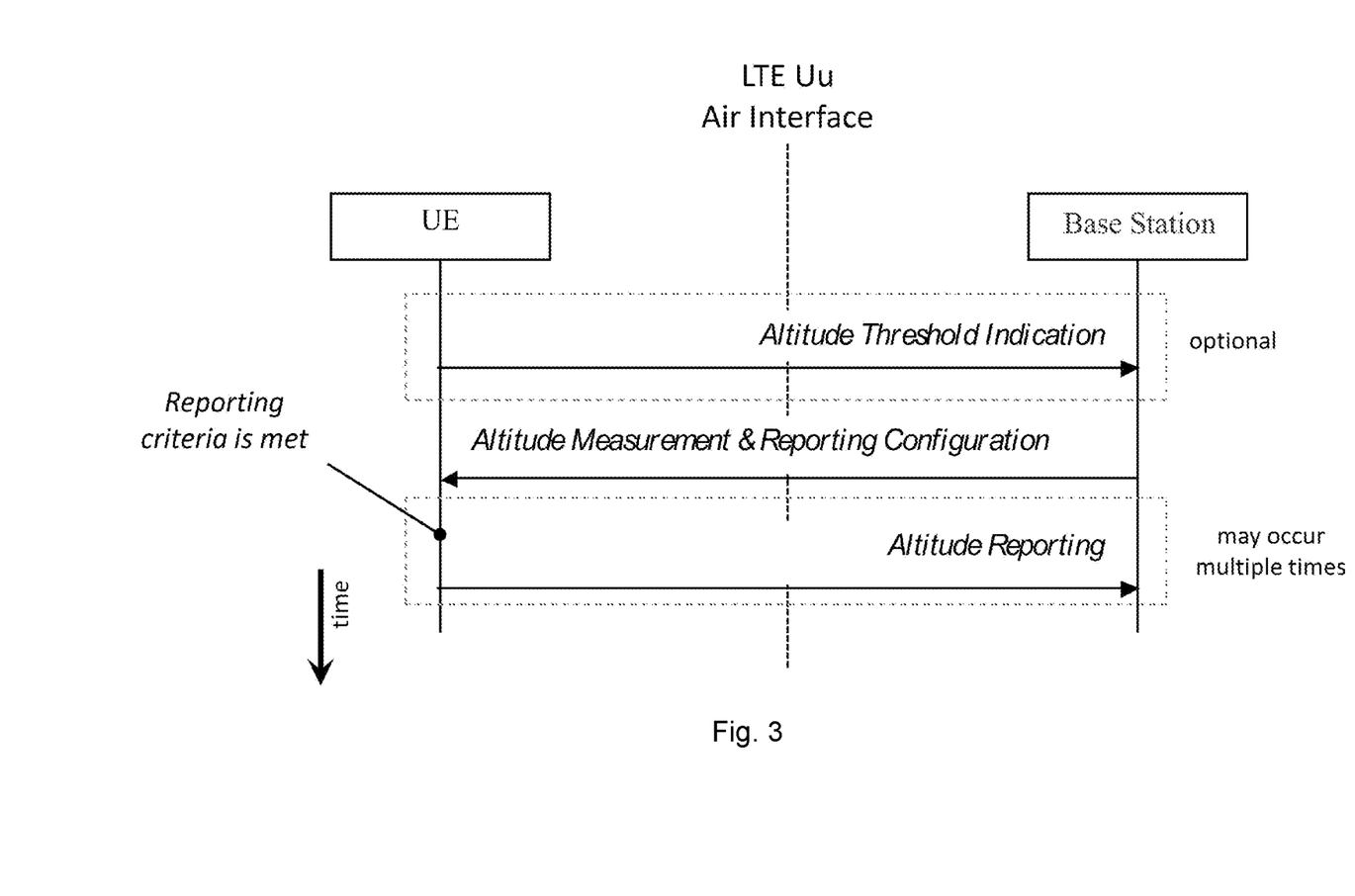
FIG. 3 shows an exemplary exchange of messages exchanging altitude related information.

FIG. 3 depicts how a Drone-UE informs the infrastructure side when a pre-configured altitude threshold value has been exceeded, e.g. when the Drone-UE is flying higher than 10 m-15 m in a rural area. Alternatively, a trigger for sending this (optional) indication message to the infrastructure side may be the Drone-UE meeting a high-altitude coverage layer entering condition (as will be described in detail in context of FIG. 4).

If such a trigger (or, indication message) is received, or independently from any trigger (or, indication message), the network infrastructure side may choose to configure regular altitude measurements in the Drone-UE and reporting of related measurements samples from the Drone-UE to the base station. Configuration may for instance comprise periodicities, further threshold values, trigger events, measurement and reporting granularities, and so on. Reporting of one or more altitude measurement values may be a continuous process, for instance when a reporting periodicity has been configured. In one embodiment, the altitude measurement and reporting configuration may comprise a threshold value below which the Drone-UE stops reporting of altitude measurements (e.g., when the Drone-UE has returned to "usual" altitude layers).

For the collection and reporting of the novel measurements related to a device's altitude, the existing measurement configuration and measurement reporting procedure as defined for Radio Resource Management measurements (cf. 3GPP TS 36.331) could be re-used. Alternatively, a new pair of RRC messages could be defined for this purpose.

As far as thresholds are concerned, the infrastructure side may configure individual altitude thresholds in a Drone-UE via dedicated signalling. Alternatively, one or more base station(s) may broadcast threshold parameters for Drone-UEs, e.g. the height above which altitude reporting is expected from Drone-UEs. The broadcast of these thresholds may be done, for example, in system information broadcast messages. This alternative has the advantage that base stations may be configured with one or more height values that are typical for the surrounding topology (cf. details of the second aspect of the present invention, where we discuss a location dependent definition of "extraordinary altitudes").

With regard to option B), this may be implemented as follows.

Figure 4:
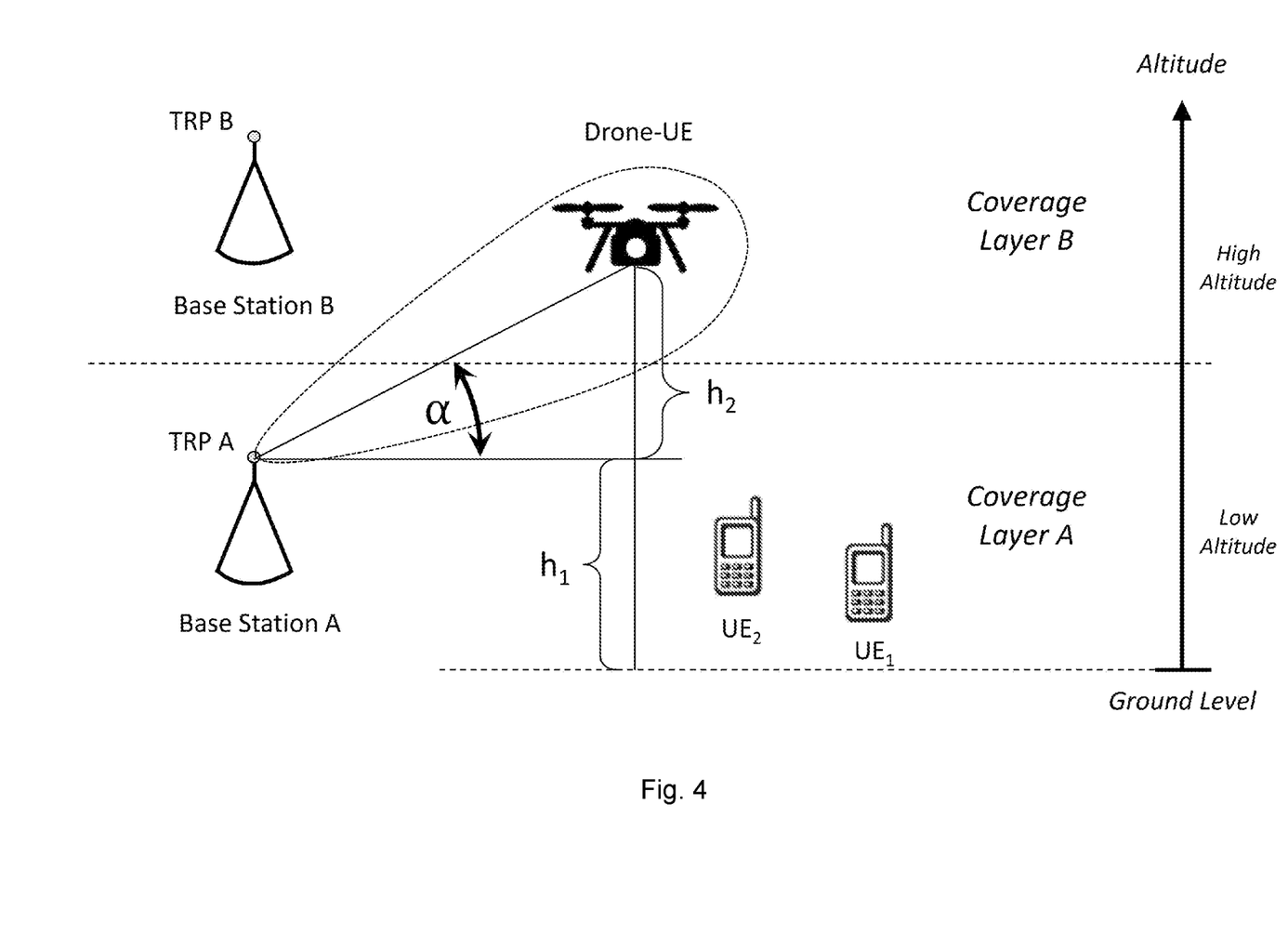
FIG. 4 shows an exemplary representation of a layered cell structure and an angular measurement of a Drone-UE's elevation.

FIG. 4 depicts the two network infrastructure variants according to option B. A first variant may be termed "detection based on different altitude layers".

Here, two (or more) coverage layers are deployed in different altitudes (for example, offered by the same or different base stations). When a Drone-UE in RRC_CONNECTED mode of operation is handed over from a low altitude coverage layer to a high altitude coverage layer, the involved RAN nodes can detect that a Drone-UE is gaining height (or, losing height upon handover from a high altitude coverage layer to a low altitude coverage layer).

A second variant may be termed "detection based on beamforming".

An antenna or a remote radio head, in general a transmission and reception point (TRP), associated with a base station of a cellular communication system (in case of LTE, eNodeB) uses beam forming techniques to serve a Drone-UE in RRC_CONNECTED mode of operation. If the beam used for serving the Drone-UE is raised above a pre-defined threshold angle, the base station may use this angle (cf. angle α for the beam directed to the Drone-UE by TRP A in FIG. 4) ideally in combination with the estimated distance to the Drone-UE to calculate the altitude of the Drone-UE above ground level ($h_1+h_2$).

Both network infrastructure variants 1) and 2) of option B) can of course be combined. For instance, beam forming within at least one of the altitude layers could be enabled.

In another embodiment of the present invention, options A) and B) are combined. For instance, detection of an altitude based on option B1) or B2) may trigger a configuration of altitude measurements by the Drone-UE according to option A).

By means of one or more of these detection methods, the bases station(s) gain(s) knowledge about the Drone-UE's current altitude and may choose to adjust the Drone-UE's radio access settings for interference mitigation accordingly, as will be discussed in detail below. At the same time the framework for the inter-node signalling to perform interference measurements in affected neighbouring cells and a corresponding inter-node reporting can be adjusted as well.

In order to explain the invention, potential definitions of "extraordinary altitudes" and "usual altitudes" will now be discussed. The former may for instance be in the range of altitudes that are (considerably) higher than the average mounting height of base station antennas and remote radio heads. The latter may for instance be in the range of altitudes (considerably) lower than or equal to the average mounting height of base station antennas and/or remote radio heads that were installed to serve the legacy UE population residing on the ground.

In some regions 10 m-15 m above the ground might represent a threshold above which no conventional UE can be expected to be operating, while in other areas 150 m or even up to 400 m (big cities with high-rise buildings) may be an appropriate threshold value.

As one can see, the terms "extraordinary altitudes" and "usual altitudes" are relative expressions. The absolute values may differ from location to location (e.g., between city centre and suburb). A location may be a region, a county, a neighbourhood, a district, company premises (e.g., factory, plant, or office building), school grounds, or a (group of) cell coverage area(s), or a (group of) tracking area(s).

Figure 5:
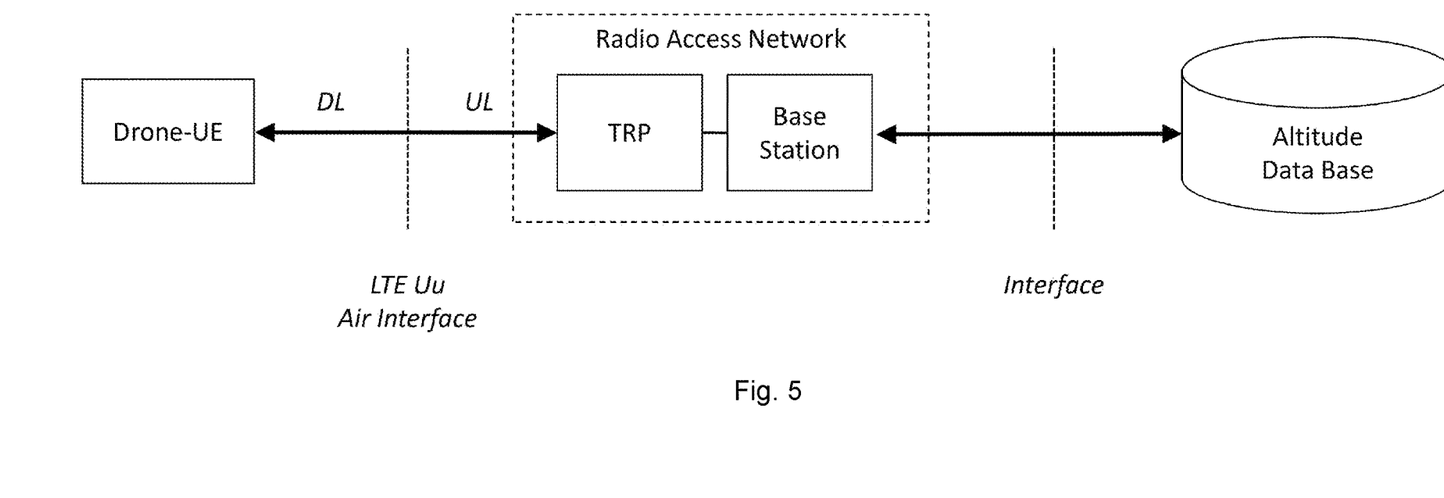
FIG. 5 illustrates an altitude database connected to a network.

In context of the present invention data base interrogations to retrieve locally valid thresholds and case-by-case decisions to determine what "extraordinary altitudes" and/or "usual altitudes" actually mean in a given location are therefore part of the present invention. FIG. 5 shows an altitude database connected to a base station via an interface. The database may be located in the core network (CN) and the interface may be the S1 interface. Alternatively, the database may be located outside the CN and the interface may be an interface other than the S1 interface.

In one embodiment, the threshold for deciding whether an "extraordinary altitude" has been reached is different from the threshold for deciding whether a "usual altitudes" has been reached (at the same location). In yet another embodiment timer values may be configured to avoid hysteresis, i.e. only when the Drone-UE's altitude is below or above a given threshold for a certain amount of time, it is finally determined that the Drone-UE is flying at an "extraordinary altitude" or has returned to a "usual altitude". These timer values may also be location dependent and retrieved from the altitude database of FIG. 5.

Figure 6:
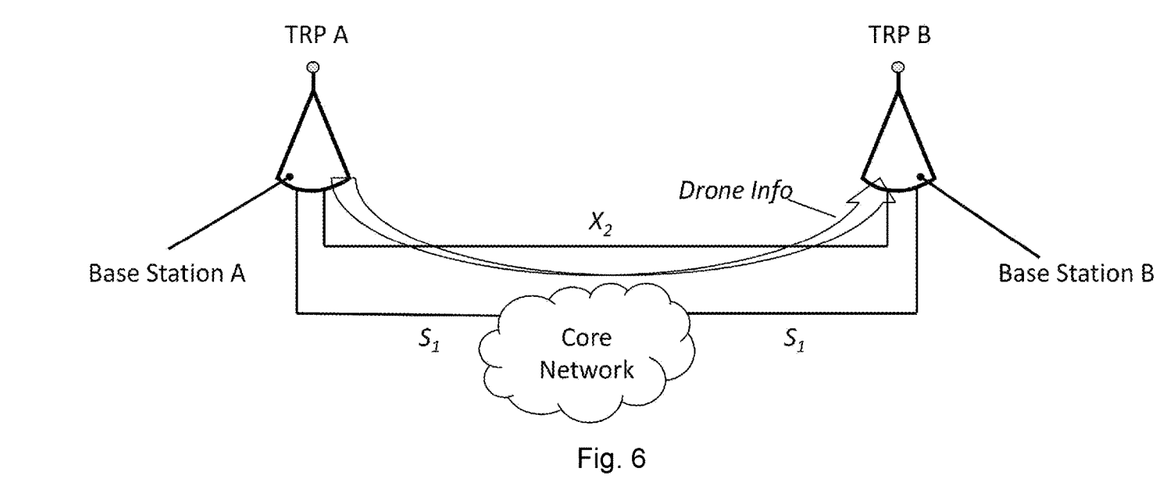
FIG. 6 is a schematic diagram illustrating an exchange of resource occupation data.
Figure 7:
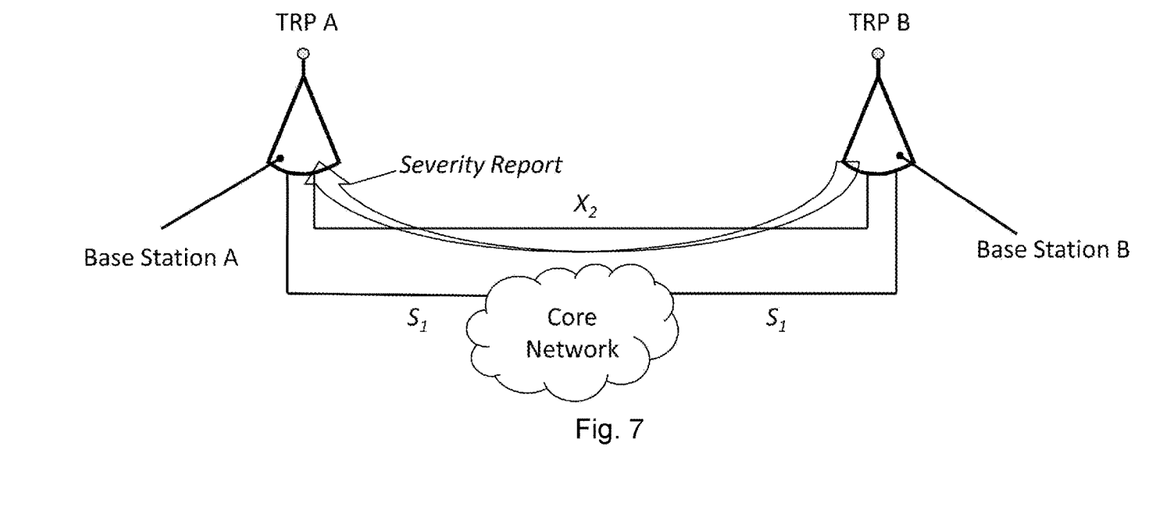
FIG. 7 is a schematic illustration illustrating an exchange of interference feedback information.

The third aspect of the invention relates to the detection and measurement of a Drone-UE's UL signal in neighbouring cells. Reference is made to FIGS. 6 and 7.

At present, only detection of an aggregated amount of UL power from unknown sources in a cell is possible. This is not sufficient to efficiently mitigate interference in upcoming Drone-UE use cases. Thus, in the scope of this invention, information ("Drone Info") about a particular Drone-UE's resource occupation data (incl. the individually configured UL reference signals) may be exchanged from the serving cell (TRP A in FIG. 6) to one or more neighbouring cell(s), starting with the direct neighbour cell(s), then possibly expanding to the next neighbour cell(s), thereby allowing detection and measurement of a particular Drone-UE's UL signal in cells other than the serving cell. The signalling expansion to neighbouring cells of a higher neighbourhood grade is discussed below.

A "Drone Info" request message may comprise an identifier of the Drone-UE, an identifier of the serving cell (TRP A), one or more interference threshold value (possibly including a hysteresis timer value for each threshold), and for the propagation of the request a maximum number of neighbouring cells and/or the maximum grade of the neighbourhood relation. The interference threshold value(s) may be configured depending on the neighbourhood relation (e.g., the interference threshold value may be lower for cells of a higher neighbourhood grade).

An option is to let all neighbouring cells that suffer from UL deterioration caused by a particular Drone-UE (and that fulfil certain reporting criteria) report the severity of the interference back to the Drone-UE's serving cell as shown in FIG. 7.

The "Severity Report" response message may be addressed to the (identifier of the) serving cell (TRP A) and comprise the identifier of the Drone-UE in question, plus an indication how bad the UL signal deterioration caused by the Drone-UE in question actually is. This may either be a measured interference value or a "affected" or "not affected" (i.e. a simple yes/no) indication. Additionally, the "Severity Report" response message may include an identifier of the interfered neighbour cell (=the reporting cell) and an information element telling the serving cell to how much (other) neighbouring cells the initial "Drone Info" request message has been propagated. As such, either multiple instances of a "Severity Report" response messages or a consolidated "Severity Report" response message can be received at the serving cell (TRP A) as a reply to one "Drone Info" request message.

Both, the "Drone Info" request message and the "Severity Report" response message may be exchanged over the S1 interface or over the X2 interface using either protocol extensions in the S1AP defined in TS 36.413 or in the X2AP defined in TS 36.423.

As the "Drone Info" request message carries information about a particular Drone-UE's resource occupation pattern (incl. information about individually configured UL reference signals, such as DM-RS and/or SRS, or a new kind of UL reference signal) the one or more neighbouring cells (here: TRP B in FIGS. 6 and 7) that may be affected by interference caused by a high-flying Drone-UE served by TRP A are enabled to determine the exact level of interference caused by the Drone-UE in question and to create either a detailed report or a simple interference indication to be sent back as part of the "Severity Report" response message. The new kind of UL reference signal may be specific to Drone-UEs and the interference problem discussed in the present document.

The fourth aspect of this invention builds up on the message exchange framework discussed in in the previous paragraph. An iterative process for the step-wise adjustment of the Drone-UE's radio access settings in the serving cell, is defined followed by some measurements in one or more affected neighbouring cells, and some inter-node signalling between the base station operating the serving cell and the base station(s) operating said neighbouring cell(s).

In detail, the "Drone Info" request message of FIG. 6 may be enhanced to carry a repetition indicator (such as a counter value) that informs the neighbouring cell(s) about a repeatedly performed change of the Drone-UE's radio access parameters in the serving cell (TRP A) aiming at reducing UL interference caused by the Drone-UE. The at least one neighbouring cell is then required to perform another iteration of UL interference measurements, and to compile a new instance of a measurement report to be conveyed to the base station serving the Drone-UE in the "Severity Report" response message as shown in FIG. 7. This message may echo the counter value back to the serving cell as a reference.

This gradual interference mitigation method according to the fourth aspect of the present invention is suited to arrive at the optimum compromise between interference mitigation and continuation of Drone-UE operation.

The following tables show a possible structure for the two inter-node signalling messages according to FIGS. 6 and 7 that may be used to exchange the novel pieces of information between the base stations involved. Alternatively, the various information elements listed here may be included in already existing S1AP or X2AP messages.

Table 1 shows an example structure of a "Drone Info" request message.

TABLE 1

| Information Element | Description | Presence |
|---|---|---|
| Message Header | | |
| Protocol Version | Identifying the protocol version used. | Mandatory |
| Message ID | Unique identifier of this message. | Mandatory |
| Message Type | Identifying this message as a "Drone Info" request message. | Mandatory |
| Identifier Originating Entity | Identifying the originator of this message, e.g. the eNB ID of the serving base station. | Mandatory |
| Identifier Receiving Entity | Identifying the intended recipient of this message, e.g. the eNB ID of a neighbouring base station. | Mandatory |
| Drone-UE Container | | |
| > Drone-UE Identifier | Identifying the Drone-UE in question. | Mandatory |
| > Cell Identifier | Identifying the cell serving the Drone-UE in question. | Mandatory |
| > Repetition Indicator | Indication the repetition Cycle according to aspect 4 of the present invention. | Optional |
| Resource Occupation Data Container (according to aspect 3 of the present invention) | | |
| > UL Reference Signals | Location and type of various UL reference signals the drone is configured to transmit in its serving cell, such as: Demodulation-Reference Signals, or Sounding-Reference Signals, or new kind of UL reference signal. | Mandatory |
| > List of potentially Disturbed Resources | Detailed information about the resources in the time/frequency grid that are potentially disturbed by UL signals transmitted by the Drone-UE | Mandatory |

TABLE 1-continued

| Information Element | Description | Presence |
|---|---|---|
| > Threshold Grade #1 | Interference threshold value that may be used to restrict reporting from a direct neighbouring cell. | Optional |
| > Timer Grade #1 | Hysteresis timer value that may be used to restrict reporting from a direct neighbouring cell | Optional |
| > Threshold Grade #2 | Interference threshold value that may be used to restrict reporting from a $2^{nd}$ grade neighbouring cell. | Optional |
| > Timer Grade #2 | Hysteresis timer value that may be used to restrict reporting from a $2^{nd}$ grade neighbouring cell | Optional |
| . . . | . . . | . . . |
| Propagation Instructions Container (according to aspect 5 of the present invention) | | |
| > Max Number of Neighbouring Cells | May be used to restrict the propagation of this request. | Optional |
| > Max Grade of Neighbourhood Relation | May be used to restrict the propagation of this request. | Optional |
| . . . | . . . | . . . |

Table 2 shows an example structure of a "Severity Report" response message.

TABLE 2

| Information Element | Description | Presence |
|---|---|---|
| Message Header | | |
| Protocol Version | Identifying the protocol version used. | Mandatory |
| Message ID | Unique identifier of this message. | Mandatory |
| Message Type | Identifying this message as a "Severity Report" response message. | Mandatory |
| In Reply To | Unique identifier of the corresponding request message received previously. | |
| Identifier Originating Entity | Identifying the originator of this message, e.g. the eNB ID of a neighbouring base station. | Mandatory |
| Identifier Receiving Entity | Identifying the intended recipient of this message, e.g. the eNB ID of the serving base station. | Mandatory |
| Drone-UE Container | | |
| > Drone-UE Identifier | Identifying the Drone-UE in question. | Mandatory |
| > Cell Identifier | Identifying the cell serving the Drone-UE in question. | Mandatory |
| Measurement Report Container (according to aspect 3 of the present invention) | | |
| > UL Interference Level | Detailed information about the measured UL interference level caused by the Drone-UE in question. | Mandatory |
| > UL Signal Deterioration | As an alternative to the Information Element above. May take on the following values: Yes, or No. | Optional |
| Propagation Report Container (according to aspect 5 of the present invention) | | |
| > Number of Neighbouring Cells | Telling the serving cell to how many (other) neighbouring cells the initial "Drone Info" Request Message has been propagated | Optional |
| . . . | . . . | . . . |

The fifth aspect of this invention is a hierarchical interference level measurement procedure stepwise involving more and more neighbouring base stations (first the direct neighbour(s), then the second next neighbour(s), followed by the third next neighbour(s), and so on). There are two possible directions for this hierarchical procedure:

Firstly, a base station associated with the serving cell initiates the procedure. Neighbouring base stations are asked to what extent the UL signal of a particular Drone-UE (operating in "extraordinary" altitudes) actually causes UL signal deterioration in neighbouring cells. Relevant neighbouring base stations which are associated with cells in which UL signal deterioration occurs reply accordingly. To realize this, the "Drone Info" request message and the "Severity Report" response message may be propagated to neighbouring cells of a higher neighbourhood grade (i.e.

stepwise involving more and more base stations, going beyond base station B shown in the FIGS. 6 and 7).

Secondly, a base station associated with a cell in which UL signal deterioration is a problem asks neighbouring base stations if they operate (or, serve) any Drone-UE that might be the cause for the detected UL signal interference. The base station which is associated with the serving cell of the Drone-UE that is causing the UL signal deterioration replies (and may choose to react accordingly). This method is shown in the FIGS. 8 and 9. Like the messages depicted in FIGS. 6 and 7, the "Interference Problem Indication" request message and the "Interference Problem Confirmation" response message may either be defined in accordance with the S1AP or X2AP protocol, or included in already existing S1AP or X2AP messages.

Figure 8:
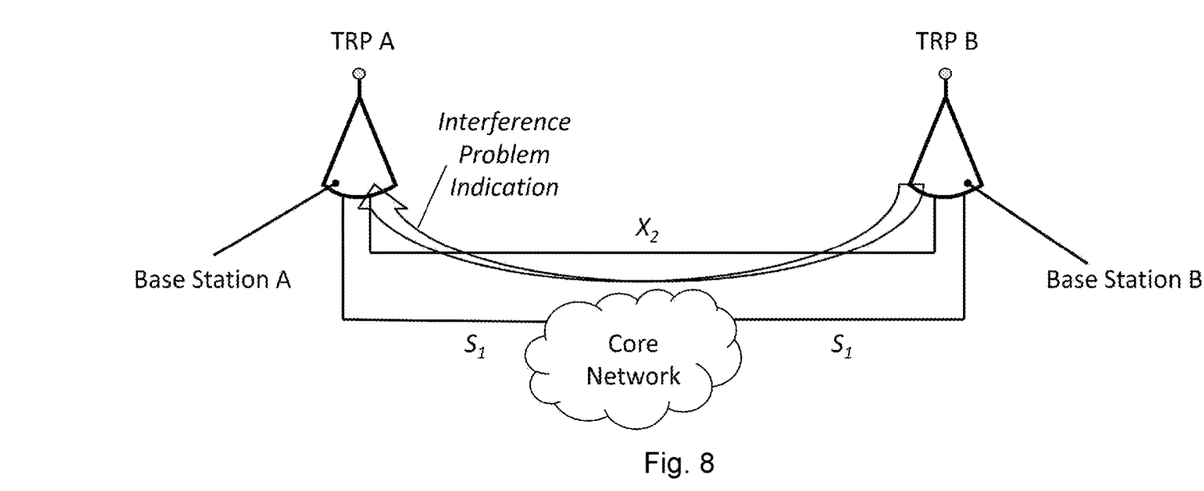
FIG. 8 is a schematic illustration of an exchange of information indicating an interference problem.
Figure 9:
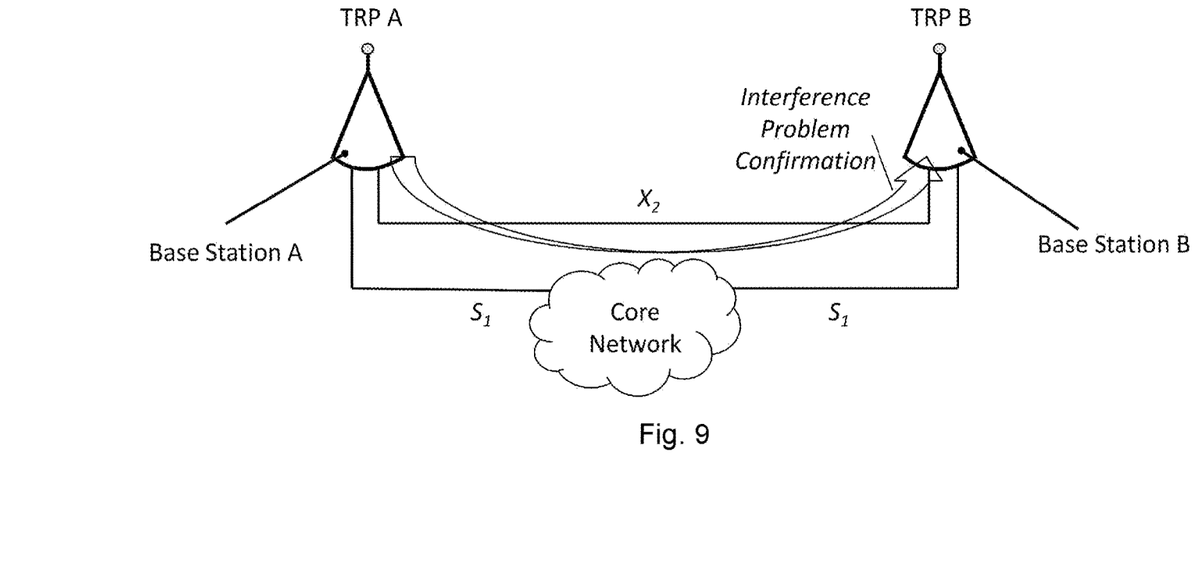
FIG. 9 is a schematic illustration of an exchange of information indicating an interference problem solution.

The following tables show a possible structure for the two inter-node signalling messages according to FIGS. 8 and 9 that may be used to exchange the pieces of information between the base stations involved. Alternatively, the various information elements listed here may be included in already existing S1AP or X2AP messages.

Table 3 shows an example structure of an "Interference Problem Indication" request message.

TABLE 3

| Information Element | Description | Presence |
| --- | --- | --- |
| Message Header | | |
| Protocol Version | Identifying the protocol version used. | Mandatory |
| Message ID | Unique identifier of this message. | Mandatory |
| Message Type | Identifying this message as an "Interference Problem Indication" request message. | Mandatory |
| Identifier Originating Entity | Identifying the originator of this message, e.g. the eNB ID of the base station spanning the interfered cell. | Mandatory |
| Cell Identifier | Identifying the cell experiencing UL signal interference presumably caused by a Drone-UE. | Mandatory |
| Identifier Receiving Entity | Identifying the intended recipient of this message, e.g. the eNB ID of a neighbouring base station that is assumed to operate a Drone-UE. | Mandatory |
| Resource Details Container | | |
| > List of Disturbed Resources | Detailed information about the resources in the time/frequency grid that are potentially disturbed by UL signals transmitted by the Drone-UE | Mandatory |
| > Power Level | Aggregated amount of UL interference power from unknown sources. | Optional |
| > Time Value | Point in time when the interference began, for example encoded as an absolute time value, or a relative time value. | Optional |
| . | . | . |
| . | . | . |
| . | . | . |
| Propagation Instructions Container (according to aspect 5 of the present invention) | | |
| > Max Number of Neighbouring Cells | May be used to restrict the propagation of this request. | Optional |
| > Max Grade of Neighbourhood Relation | May be used to restrict the propagation of this request. | Optional |
| . | . | . |
| . | . | . |
| . | . | . |

Table 4 shows an example structure of an "Interference Problem Confirmation" response message.

TABLE 4

| Information Element | Description | Presence |
| --- | --- | --- |
| Message Header | | |
| Protocol Version | Identifying the protocol version used. | Mandatory |
| Message ID | Unique identifier of this message. | Mandatory |
| Message Type | Identifying this message as a "Interference Problem Confirmation" response message. | Mandatory |
| Identifier Originating Entity | Identifying the originator of this message, e.g. the eNB ID of a base station that is serving a Drone-UE. | Mandatory |
| Identifier Receiving Entity | Identifying the intended recipient of this message, e.g. the eNB ID of a neighbouring base station that is suffering from UL signal interference. | Mandatory |
| In Reply To | Unique identifier of the corresponding request message received previously. | |

TABLE 4-continued

| Information Element | Description | Presence |
|---|---|---|
| Cell Identifier | Identifying the cell experiencing UL signal interference presumably caused by a Drone-UE. | Mandatory |
| Interference Container | | |
| > Confirmation | Indication to the receiving entity whether the originating entity is serving a Drone-UE that is likely to be responsible for the UL signal deterioration in the specified cell: Yes, or No. | Optional |
| > Mitigation Means | Indication to the receiving entity whether the originating entity took measures aiming at reducing the UL signal deterioration caused in the specified cell: Yes, or No. | Optional |
| Propagation Report Container (according to aspect 5 of the present invention) | | |
| > Number of Neighbouring Cells | Telling the interfered cell to how many (other) neighbouring cells the initial "Interference Problem Indication" Request Message has been propagated | Optional |
| . | . | . |
| . | . | . |
| . | . | . |

Regarding the two propagation containers for "instructing" and "reporting", the field values in these containers may be ideally controlled and/or set by some core network entity (e.g., the MME) if the messages are exchanges via the S1 interface between the core network and the various base stations. Doing so would allow the MNO to keep track of the dissemination (i.e. of the propagation depth) of messages among neighbouring base stations.

It is noteworthy to mention that the message pair of FIGS. 8 and 9 may precede the message pair of FIGS. 6 and 7 (and vice versa). In other words, an "Interference Problem Indication" request message may initiate the iterative process for a step-wise adjustment of the Drone-UE's radio access parameters in the serving cell according to the fourth aspect of the present invention.

The sixth aspect of this invention deals with the adjustment of radio access parameters aiming at reducing the interference caused in neighbouring cells. For instance, this objective can be achieved by applying at least one of the following means:
  reducing the UL transmit power in the Drone-UE,
  configuring long hibernation cycles for the Drone-UE,
  turning off the radio transmitter of the Drone-UE,
  applying service limitations (i.e. disabling certain bearers or services for the Drone-U E),
  reconfiguring the physical resources to be used for the Drone-UE's UL traffic (without changing the current serving cell),
  triggering handover to another cell or frequency layer, for example away from lower frequencies towards higher frequencies (and vice versa), away from a small cell towards a macro cell (and vice versa),
  switching from predominantly omnidirectional UL transmission characteristics to highly directive UL beam transmissions,
  using special cell admission control methods, for example disallowing access for Drone-UEs to certain cells (as long as these are operating in "extraordinary" altitudes), allowing access for Drone-UEs to certain cells (as soon as these are operating in "usual" altitudes again),
  triggering handover to another Radio Access Technology (RAT),
  engaging in an UL resource occupation coordination process with neighbouring base stations, (incl. resource assignment for D2D and V2X traffic), for example with $1^{st}$ grade neighbours (i.e. with direct neighbouring cells), $2^{nd}$ grade neighbours, $3^{rd}$ grade neighbours, etc. so that the perceived throughput performance of the conventional terrestrial UEs is not deteriorated (too much). It is advantageous to determine the counter measures based on the Drone-UE's indicated radio access capabilities, the reported altitude and/or on the level of interference detected and/or reported by at least one of the neighbouring base stations.

In a seventh aspect, enhanced "UE Radio Access Capabilities" for Drone-UEs are provided. The Drone-UE is enabled to report at least one of its capabilities relevant for this invention, such as
  Altitude reporting (frequency, accuracy, granularity, etc.),
  UL transmit power reduction based on Infrastructure command,
  Support of long hibernation cycles for UL interference mitigation in neighbouring cells (incl. D2D and V2X communication),
  Applying service limitations to switching off the radio transmitter, disabling certain bearers and disabling certain services,
  Reconfiguration of physical resources to be used for UL traffic (without changing the current serving cell),
  Support of beam forming (i.e. switching from a predominantly omnidirectional UL transmission to a highly directive UL beam transmissions),
  Using special cell admission control methods for Drone-UEs, for example disallowing access to certain cells (as long as the Drone-UE is operating in "extraordinary" altitudes), allowing access for Drone-UEs to certain cells (as soon as the Drone-UE has returned to "usual" altitudes),
  Ability to engage in an UL resource occupation coordination process with neighbouring base stations, (including resource assignment for D2D and V2V traffic), for example with 1st grade neighbours (i.e. with direct neighbouring cells), 2nd grade neighbours, 3rd grade neighbours, etc.

Support of the iterative radio access parameter control method to stepwise involve more and more neighbouring cells.

One or more of the capabilities listed above, that are related to UL interference mitigation for the various Drone-UE use cases, may be included into the list of UE radio access capability parameters defined in 3GPP TS 36.306. The encoding of these parameters should be according to 3GPP TS 36.331, so that the UE radio access parameters for Drone-UEs can be exchanged at RRC protocol layer in course of the UE capability transfer procedure.

As the list of UE radio access capabilities can be quite long, it may be advantageous to let the eNodeB ask for a sub set of all capabilities. Thus, the invention enables the eNodeB to request only those capabilities that are relevant for Drone-UEs and their behaviour in the air. For this, a separate indication in the UE Capability Request message is needed.

Various modifications to the embodiments of the invention may be contemplated. For example, with regard to sidelink communication in case of D2D or V2X communication taking place in a neighbouring cell, the base station spanning the neighbouring cell may delegate the task of detecting and measuring the UL signal deterioration to one or more UEs that is (are) involved in the sidelink communication. In this case, the UE(s) measure(s) the UL interference caused by the Drone-UE on the sidelink and create(s) the interference report(s) either in part or in entirety. In a first step the report(s) is (are) sent back (e.g., via the LTE Uu air interface) from the UEs to their base station that is spanning the neighbouring cell (Base Station B) and in a second step the base station that is offering the serving cell of the Drone-UE (Base Station A) is informed via inter-node signalling (e.g., via the S1 or X2 interfaces) as discussed above.

The analysis of movement patterns of UEs operating in "extraordinary altitudes" is yet another aspect of the present invention. By doing so it becomes possible for the MNO to differentiate between legacy UEs residing in high buildings (i.e., those that are carried around in people's pockets and thus show rare and rather slow movements) and usually causing normal interferences, and Drone-UEs (i.e., those that are free to move in all possible directions at higher speed (i.e. above the average speed of pedestrians of approx. 6 km/h) and with an expected frequent change of heading.

The flight movement patterns can either be requested from a Drone-UE in addition to altitude values (as in option A "Reporting of movement patterns by the UE (in addition to its altitude)."), or derived from antenna characteristics over a certain amount of time (as in option B2 "The network infrastructure determines the movement patterns of a UE (in addition its altitude) by means of a sophisticated beamforming analysis.")

It should be noted that the names and encoding variants of the messages and/or information elements (IE) discussed herein are to be understood to merely serve as examples. There are many other options to exchange the information between the entities involved as well as for the encoding of parameters and their values fields. This invention is by no means restricted to the encoding examples disclosed herein.

Furthermore, the parameters proposed to be used may be assorted in one way or another. For example, they may be collated in a new or already existing hierarchical structure, or grouped together with other information elements (IE) for instance in form of a list.

The invention claimed is:

1. A method of reducing interference in a mobile communication system caused by a first user equipment, UE, device operating in a cell at a significantly higher altitude than other UE devices in the cell so as to cause interference, the method comprising:
   detecting that the first UE device is operating at an altitude considered by the mobile communication system to be an extraordinary altitude; and
   reducing interference caused at a non-serving base station of the mobile communication system by the first UE device operating at the extraordinary altitude by controlling the operation of the first UE device,
   wherein in the method:
   a base station serving the first UE device in the cell determines, using a radio link between the first UE device and the serving base station, that an altitude of the first UE device exceeds a threshold and having determined that the altitude of the first UE device exceeds the threshold configures the first UE device to report altitude measurements of the first UE device, the reported altitude measurements being used by the serving base station to detect that the first UE device is operating at an altitude considered by the mobile communication system to be an extraordinary altitude.

2. The method according to claim 1, wherein the extraordinary altitude is configurable by a network operator.

3. The method according to claim 1, wherein cellular coverage provided by the mobile communication system is subdivided into coverage layers and the mobile communication system detects when the first UE device transitions from a low altitude layer to a high altitude layer resulting in a handover procedure being performed.

4. The method according to claim 1, wherein the serving base station of the mobile communication system determines the altitude of the first UE device by determining an angle of a radio beam oriented towards the first UE device.

5. The method according to claim 1, wherein the mobile communication system varies what is considered to be an extraordinary altitude by maintaining a database of altitudes considered to be extraordinary altitudes for particular locations or cells.

6. The method according to claim 1, wherein the serving base station exchanges information with one or more neighbouring base stations, informing the one or more neighbouring base stations of resource occupation data of the first UE device for enabling the at least one neighbouring base stations to perform detection and measurement of signals originating from the first UE device.

7. The method according to claim 6, wherein the exchange is performed by sending a request message including at least one of an identifier of the first UE device, an identifier of the serving cell, at least one interference threshold value.

8. The method according to claim 6, wherein the one or more neighbouring base stations transmit messages to the serving base station reporting a degree of interference caused by the first UE device.

9. The method according to claim 8, wherein the information transmitted by the serving base station includes a repetition indicator indicating to the one or more neighbouring base stations that they should perform repeated detection and measurement of the signals originating from the first UE device and provide repeated reporting messages to the serving cell base station.

10. The method according to claim 1, wherein the serving base station reduces interference caused by the first UE device by performing one of:

reducing an uplink transmit power of the first UE device;
configuring the first UE device to have a longer hibernation cycle;
turning off a radio transmitter of the first UE device;
applying a service limitation to the first UE device;
reconfiguring physical resources to be used by uplink traffic of the first UE device;
triggering handover of the first UE device to another cell or frequency;
switching from an omnidirectional uplink transmission characteristic to a directional uplink transmission characteristic;
applying special cell admission control methods;
triggering handover to another radio access technology; and
engaging in an uplink resource occupation coordination process.

11. The method according to claim 10, wherein the first UE device reports its capability for performing altitude related interference suppression to the serving base station.

* * * * *